(12) United States Patent
Tillin et al.

(10) Patent No.: US 6,999,155 B2
(45) Date of Patent: Feb. 14, 2006

(54) POLARIZATION ROTATOR, PARALLAX BARRIER, DISPLAY AND OPTICAL MODULATOR

(75) Inventors: Martin David Tillin, Oxfordshire (GB); Adrian Marc Simon Jacobs, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 45 days.

(21) Appl. No.: 10/603,124

(22) Filed: Jun. 24, 2003

(65) Prior Publication Data

US 2004/0021821 A1 Feb. 5, 2004

(30) Foreign Application Priority Data

Jun. 28, 2002 (GB) .................................. 0215057

(51) Int. Cl.
*G02F 1/139* (2006.01)

(52) U.S. Cl. .......................... 349/193; 349/99; 349/194
(58) Field of Classification Search ................... 349/99, 349/193, 194
See application file for complete search history.

(56) References Cited

U.S. PATENT DOCUMENTS

| 5,249,070 | A | * | 9/1993 | Takano | 349/136 |
| 5,745,200 | A | * | 4/1998 | Kikuchi et al. | 349/99 |
| 5,875,055 | A | * | 2/1999 | Morishima et al. | 359/465 |
| 5,886,754 | A | * | 3/1999 | Kuo | 349/8 |
| 5,933,207 | A | * | 8/1999 | Wu | 349/99 |
| 6,341,001 | B1 | * | 1/2002 | Kwok | 349/96 |
| 6,633,358 | B1 | * | 10/2003 | Kwok et al. | 349/136 |

* cited by examiner

*Primary Examiner*—Andrew Schechter
(74) *Attorney, Agent, or Firm*—Renner, Otto, Boiselle & Sklar, LLP

(57) ABSTRACT

A polarization rotator is provided for rotating the polarization direction of linearly polarized light by any arbitrary angle other than 90°. The device comprises a layer of liquid crystal material disposed between alignment surfaces. In one mode, a 90° twist is induced in the liquid crystal director. An expression is provided for relating the retardation of the layer to the amount of polarization rotation and the angle between the polarization direction of incident light and the alignment direction at the input side of the liquid crystal layer.

32 Claims, 6 Drawing Sheets

Viewed from light source, orientation θ with respect to polariser transmission axis:

0°    −22.5°    +67.5°    +45°

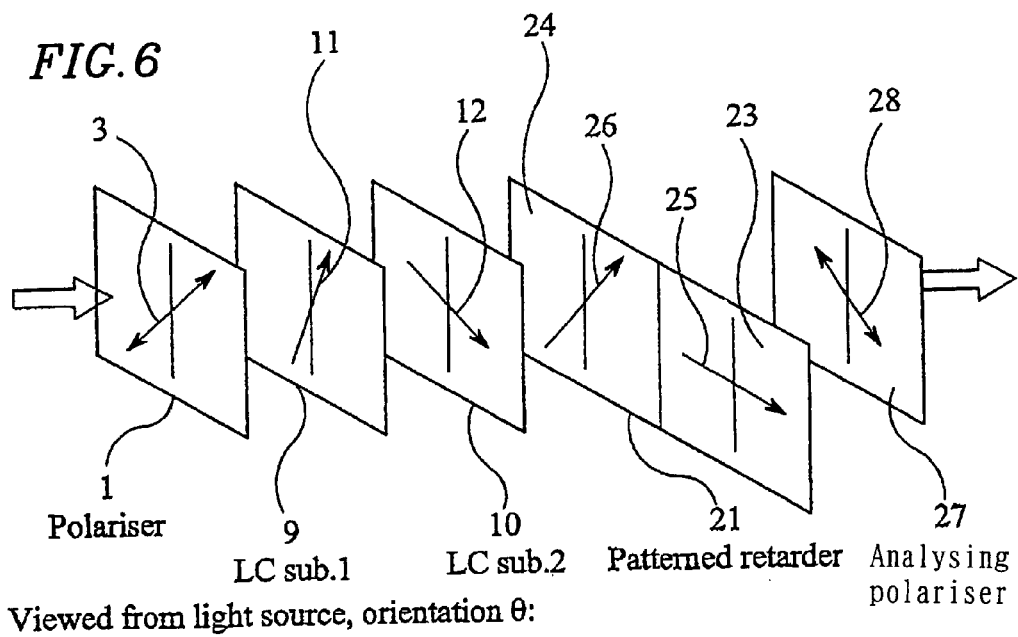
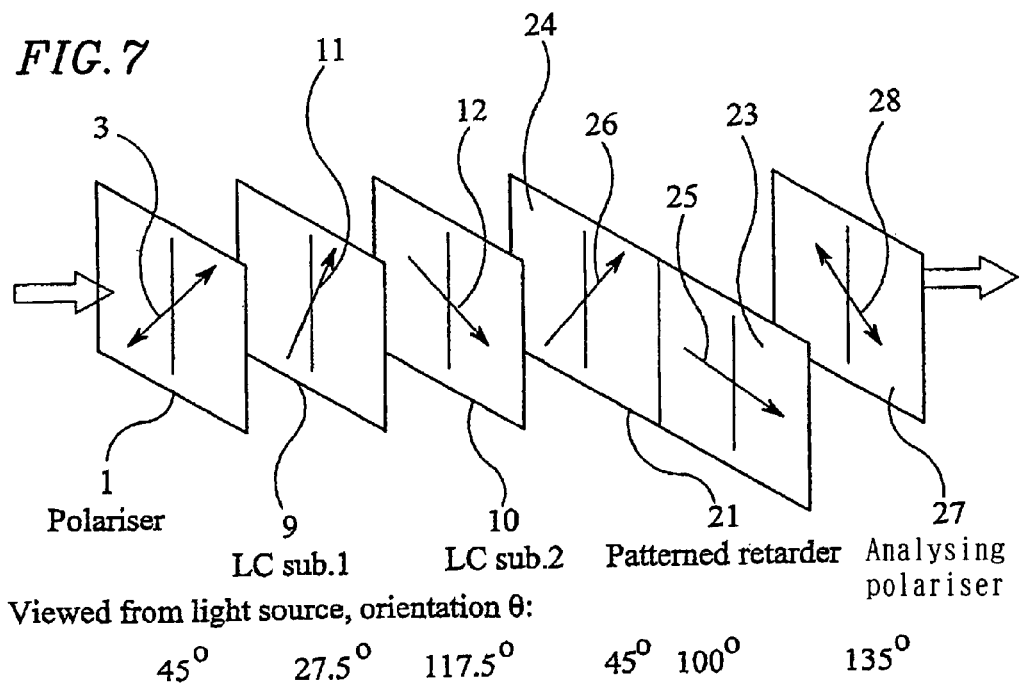

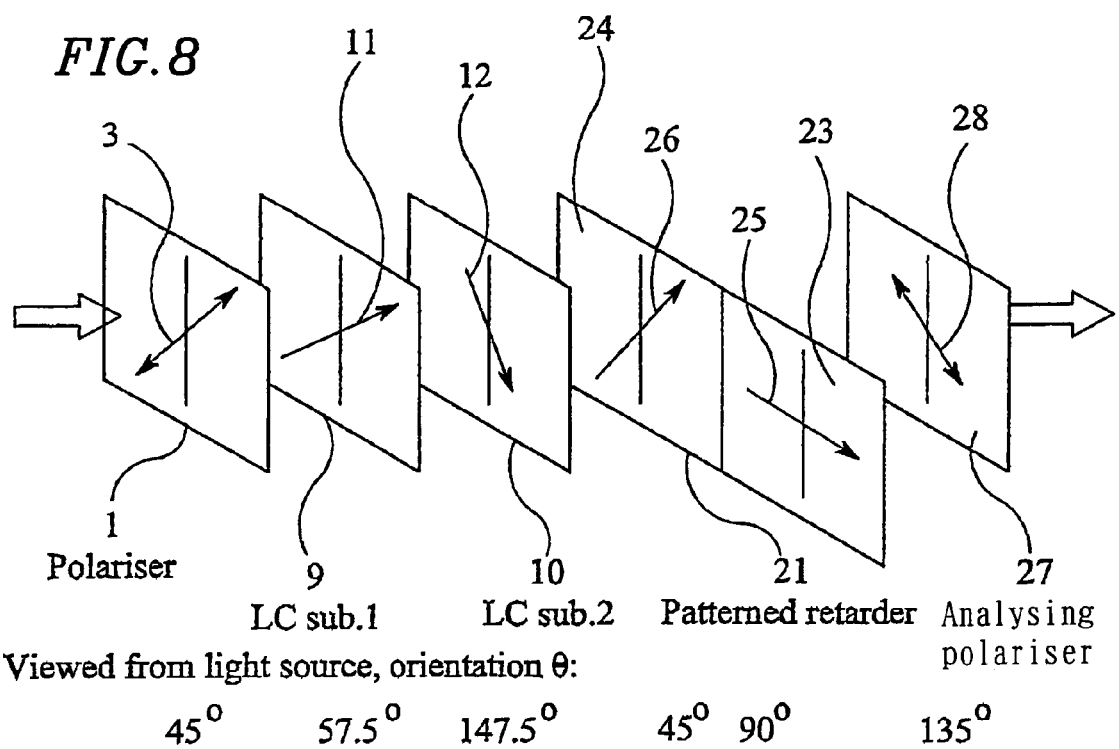

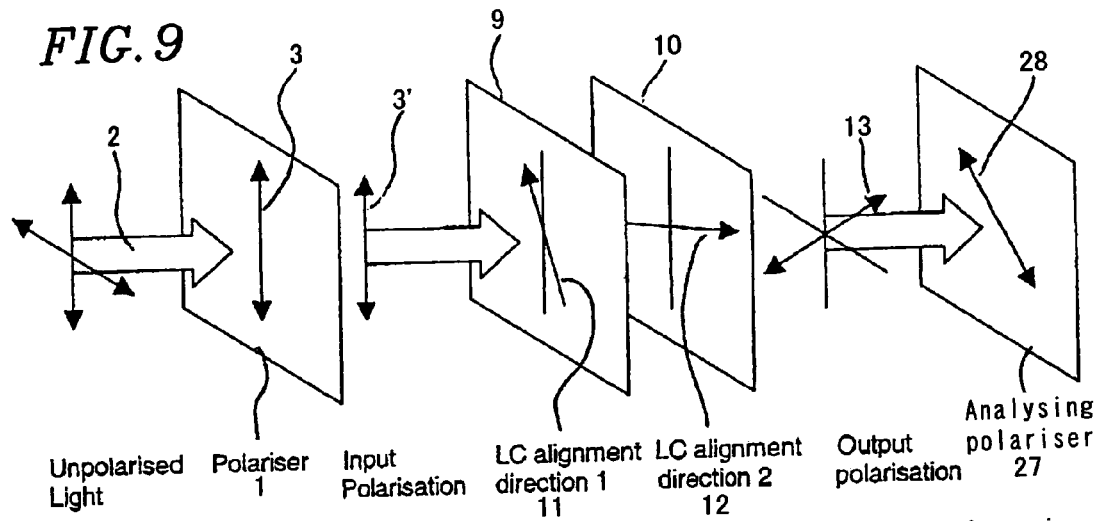
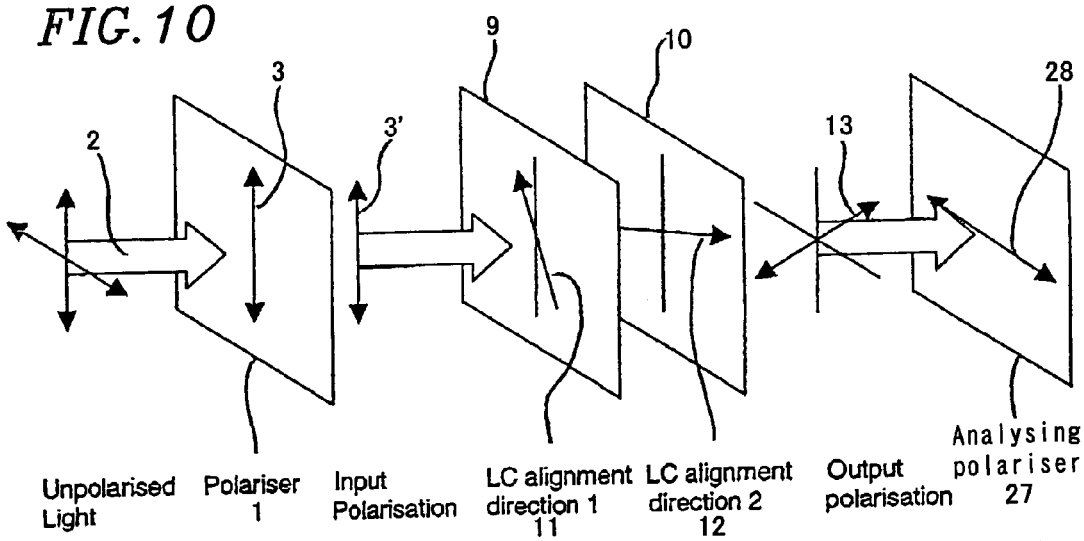

POLARIZATION ROTATOR, PARALLAX BARRIER, DISPLAY AND OPTICAL MODULATOR

BACKGROUND OF THE INVENTION

1. Field of the Invention

The present invention relates to a polarization rotator for rotating the plane of polarization of linearly polarized light by an arbitrary angle. Such a rotator may be used, for example, as part of a parallax barrier in a display or as an optical modulator in telecommunications. The present invention also relates to parallax barriers, displays and optical modulators including such polarization rotators.

2. Description of the Related Art

A known type of liquid crystal device (LCD) is the twisted nematic (TN) type. In such a device, a layer of nematic liquid crystal material is disposed between opposing alignment surfaces, such as rubbed polyimide, which cause the liquid crystal director to twist through 90° from one alignment surface to the other in the absence of an applied field. In the absence of an applied field, the plane of linearly polarized light passing through the device is rotated by 90°.

A relatively low voltage, for example between 0 and 3 volts, is sufficient to switch such TN LCDs. When switched to the non-rotating state, the mid-plane tilt angle of the liquid crystal director rises above a predetermined angle such that the surface regions of the liquid crystal material adjacent the alignment surfaces may be considered as substantially decoupled voltage-dependent optical retarders. Each of these retarders may be represented by a single optic axis along the alignment direction of the alignment surface. The alignment directions of the opposing surfaces are orthogonal to each other so that, provided the pre-tilt of the liquid crystal molecules at the alignment surfaces are substantially equal, the retardations of the surface regions of the liquid crystal layer effectively cancel each other out so that the device provides substantially zero retardation. However, this self-compensation only occurs for twist angles of 90°.

TN LCDs having twists other than 90° are also known. When linearly polarized light is passed through such devices, the polarization is converted to elliptical polarization. In order to switch such a device so as to have substantially no effect on the polarization of light passing therethrough, a theoretically infinite voltage is required in order to reduce the retardation to zero.

Beynon et al, Journal of the SID, 1999, 7, 71 disclose a technique for calculating linear to circular polarization conversion in a TN LCD and apply the result to reflective displays comprising a liquid crystal spatial light modulator disposed between a reflector and a polariser.

SUMMARY OF THE INVENTION

According to a first aspect of the invention, there is provided a polarization rotator for rotating the polarization direction of linearly polarized light by an angle γ different from 90°, comprising a layer of liquid crystal material disposed between a first input alignment surface and a second output alignment surface, the rotator having a mode in which a 90° twist of the liquid crystal director is induced across the layer, the layer having a retardation substantially given by:

$$\tan[\pm\frac{\pi}{2} - \gamma] = \frac{\tan[\pm\frac{\pi}{2}\cdot\sqrt{1+\alpha^2}]}{\sqrt{1+\alpha^2}}$$

$$\alpha = \pm\frac{2\cdot\Delta n\cdot d}{\lambda}$$

$$2\theta = \gamma \mp \frac{\pi}{2}$$

where λ is a wavelength of light, Δn is the birefringence of the liquid crystal material, d is the thickness of the layer, and θ is the angle between the polarization direction of input light and the alignment direction of the first alignment surface.

λ may be a wavelength of visible light.

The rotator may have a further mode in which there is substantially no twist of the liquid crystal director across the layer.

The first and second alignment surfaces may induce the 90° twist of the director across the layer.

The liquid crystal material may contain a chiral dopant. The chiral dopant may induce the 90° degree twist of the director across the layer.

The liquid crystal material may be a nematic liquid crystal material of positive dielectric anisotropy.

The liquid crystal material may be a smectic liquid crystal material.

The liquid crystal material may be a nematic liquid crystal material of negative dielectric anisotrophy.

The pretilts at the first and second alignment surfaces may be substantially equal to each other.

The rotator may comprise an electrode arrangement for selectively applying a field across at least one region of the layer. The electrode arrangement may comprise an active or passive matrix.

The rotator may comprise an input polariser having a transmission axis oriented at −θ to the alignment direction of the first alignment surface.

The rotator may comprise an output polariser having a transmission axis substantially perpendicular to the polarization direction of the input light.

The rotator may comprise an output polariser having a transmission axis oriented at substantially (γ±n.90)° to the polarization direction of the input light, where n is an integer.

The absolute value of γ may be greater than or equal to 40° and may be less than or equal to 70°. γ may be equal to ±45° and Δn.d/λ may be equal to 0.487. θ may be equal to ∓22.5°. As an alternative, θ may be equal to ∓12.5°.

γ may be equal to ±55° and Δn.d/λ may be equal to 0.55. θ may be equal to ∓17.5°.

The absolute value of γ may be greater than or equal to 175° and may be less than or equal to 180°. γ may be equal to 180°, θ may be equal to ±45° and Δn.d/λ may be equal to 1.414. As an alternative, γ may be equal to ±178°, θ may be equal to ±44° and Δn.d/λ may be equal to 0.105.

According to a second aspect of the invention, there is provided a parallax barrier comprising a rotator according to the first aspect of the invention.

The barrier may comprise a patterned retarder, such as a halfwave retarder. The retarder may comprise first and second regions and γ may be equal to the included angle between the slow axes of the first and second regions. The included angle may be between 40° and 70°. The slow axes of one of the first and second regions may be parallel or perpendicular to the polarization direction of the input light. The slow axes of the other of the first and second regions may be oriented at 45° to the polarization direction of the input light. As an alternative, the slow axes of the other of the first and second regions may be oriented at 55° to the polarization direction of the input light.

According to a third aspect of the invention, there is provided a display comprising a rotator according to the first aspect of the invention or a barrier according to the second aspect of the invention.

According to a fourth aspect of the invention, there is provided an optical modulator comprising a rotator according to the first aspect of the invention.

It has been found that a TN LCD with a 90° twist can be used to rotate the plane of polarization of linearly polarized light by any arbitrary angle. The effect may be modulated (between providing polarization rotation and providing no polarization rotation) by means of a relatively low finite voltage. Such a device has many applications, for example as part of a parallax barrier in a switchable 2D/autostereoscopic 3D display and as an optical modulator in an optical telecommunications system.

Throughout the present specification, positive values of angles may be either clockwise or anti-clockwise, with negative values then referring to angles in the opposite direction. Also, all angles of polarization directions and retarder slow axes are expressed "modulo 180°". Thus, each angle β is equivalent to each angle (β+n.180)°, where n is any integer. However, in some embodiments, because of the nature of their constructions, a value of β may be preferred over the value of (β+180°) because of improved performance.

BRIEF DESCRIPTION OF THE DRAWINGS

The invention will be further described, by way of example, with reference to the accompanying drawings, in which:

FIG. 6 is a diagram illustrating part of the display shown in FIG. 5;

FIG. 7 is a diagram illustrating a polarization rotator constituting a second embodiment of the invention;

FIG. 8 is a diagram illustrating a modified part of the display shown in FIG. 5;

FIG. 9 is a diagram illustrating a polarization rotator constituting a third embodiment of the invention; and FIG. 10 is a diagram illustrating a polarization rotator constituting a fourth embodiment of the invention.

Like reference numerals refer to like parts throughout the drawings.

DESCRIPTION OF THE PREFERRED EMBODIMENTS

Figure 1:
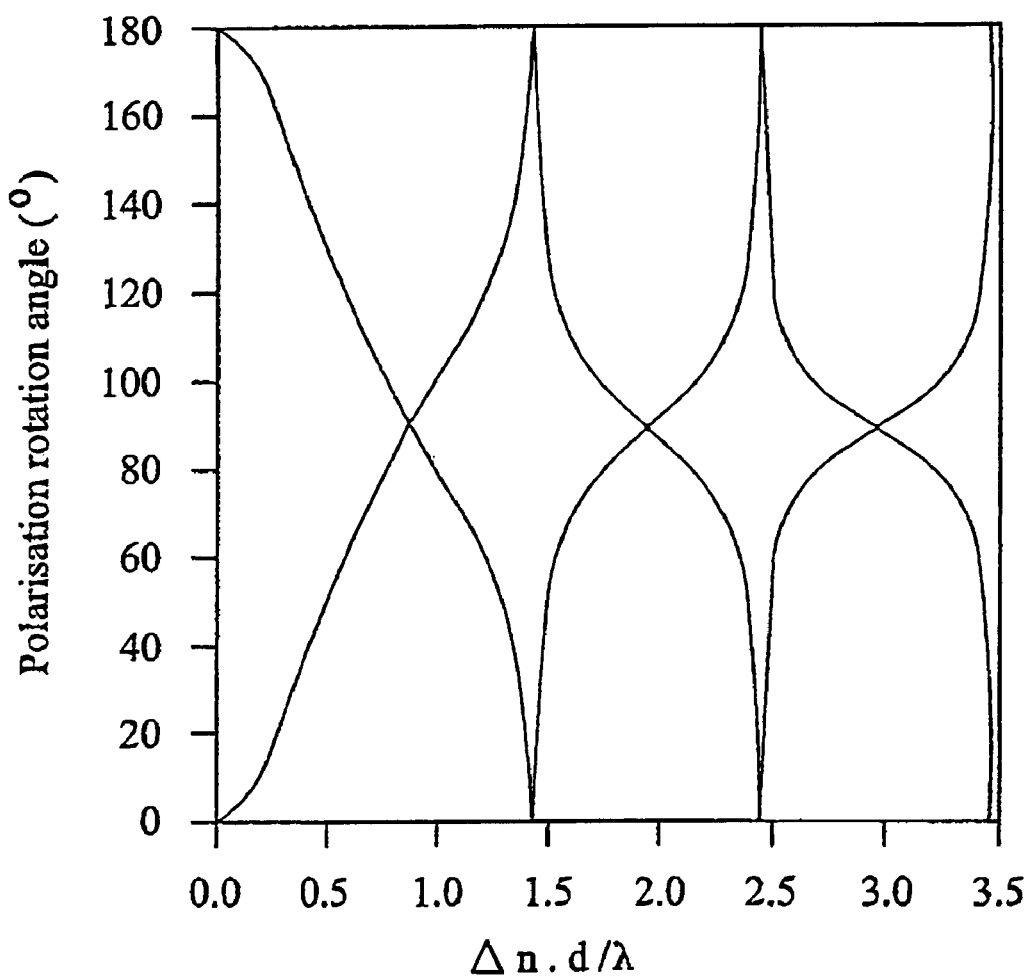
FIG. 1 is a graph of polarization rotation against retardation.

It is possible to derive conditions for which an LCD converts a first linear polarization to any arbitrary different linear polarization of light, such as visible light, based on the technique disclosed by Beynon et al, Journal of the SID 1999, 7, 71. By setting the twist angle φ to + or −90° (+ or −π/2), the following condition relates the angle γ of rotation of the linear polarization azimuth (with respect to the incident polarization azimuth) to the retardation of a nematic liquid crystal layer:

$$\tan\left[\pm\frac{\pi}{2}-\gamma\right] = \frac{\tan\left[\pm\frac{\pi}{2}\cdot\sqrt{1+\alpha^2}\right]}{\sqrt{1+\alpha^2}}$$

$$\alpha = \pm\frac{2\cdot\Delta n\cdot d}{\lambda}$$

$$2\theta = \gamma \mp \frac{\pi}{2}$$

where d is the thickness of the layer, λ is the wavelength of light, Δn is the birefringence of the liquid crystal material, and θ is the angle between the azimuth of the incident linear polarization and the input director of the liquid crystal. This is represented graphically in FIG. 1, which plots the rotation angle γ as a function of the retardation Δn.d/λ for the first three "branches" or solutions for positive values of γ. Negative values of γ may be obtained by reflecting the graph of FIG. 1 about the x axis but, as a polarization rotation of +45° is substantially identical to a polarization rotation of −135°, these curves have not been shown. The curves are periodic in positive or negative γ and the number of branches is infinite in extent in terms of retardation. The crossing points for γ=90° are the known Gooch-Tarry 90° TN minima.

Figure 2:
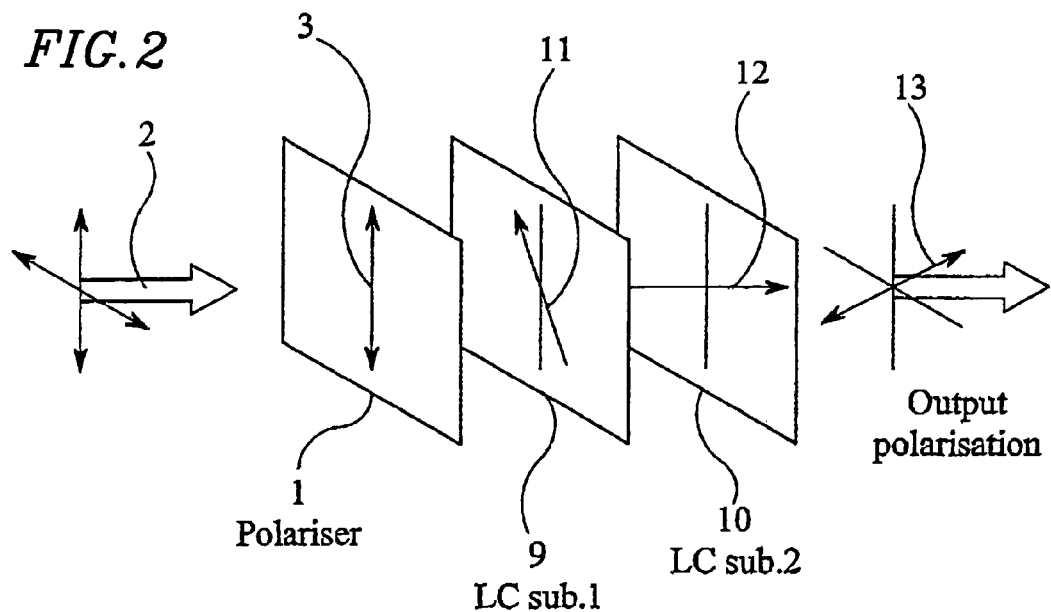
FIG. 2 is a diagram illustrating a polarization rotator constituting a first embodiment of the invention.
Figure 3:
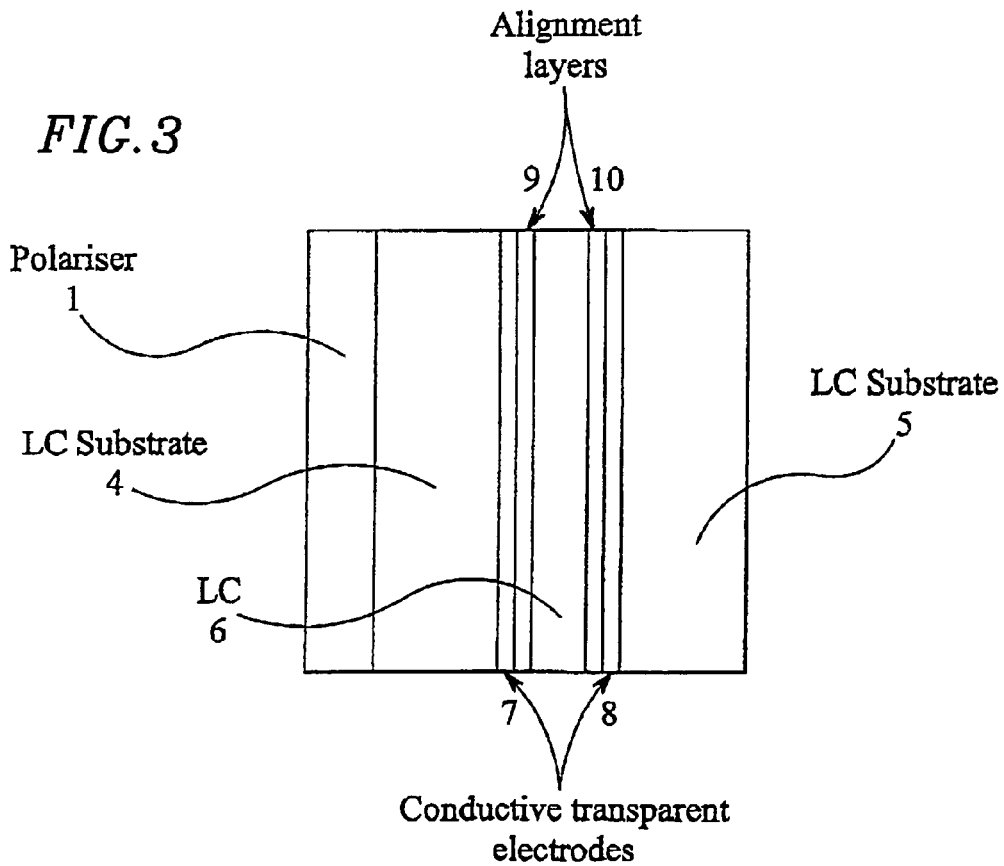
FIG. 3 is a cross-sectional view of the rotator of FIG. 2.

The polarization rotator shown in FIG. 2 is arranged to provide a rotation of linear polarization by 45°. The rotator comprises an input polariser 1 which receives unpolarized input light 2 and has a transmission axis 3 oriented vertically and defining a reference direction. As shown in FIG. 3, the polariser 1 is formed on or attached to a first liquid crystal (LC) substrate 4 which, together with a second substrate 5, defines a cell containing a liquid crystal layer 6. The inner surfaces of the substrates 4 and 5 have formed thereon conductive transparent electrodes 7 and 8, for example made of indium tin oxide (ITO), and alignment layers 9 and 10, for example comprising rubbed polyimide layers. The rubbing directions of the alignment layers 9 and 10 are orthogonal to each other.

The alignment direction of the alignment layer 9 is illustrated at 11 in FIG. 2 and is oriented at −22.5° with respect to the transmission axis 3. The alignment direction 12 of the alignment layer 10 is therefore oriented at +67.5° with respect to the transmission axis 3.

The liquid crystal material of the layer 6 is of nematic type and the alignment layers 9 and 10 induce, in the absence of an applied field across the layer 6 between the electrodes 7 and 8, a −90° twist to the liquid crystal director from the alignment layer 9 to the alignment layer 10. The alignment layers are also such that the pre-tilts at the surface regions of the layer 6 have substantially the same magnitude. A small amount of chiral dopant may be used to induce a (positive or negative) twist in the liquid crystal as desired.

The liquid crystal layer 6 has a retardation Δn.d/λ=0.487 and, in the absence of an electric field applied between the electrodes 7 and 8, the rotator rotates the plane of polarization of the light from the polariser 1 by 45° as illustrated at 13 in FIG. 2. When a sufficiently large voltage, for example of the order of 3 volts, is applied between the electrodes 7 and 8 across the layer 6, the mid-plane tilt angle of the liquid crystal director in the middle region of the layer 6 rises to a value such that the surface regions of the layer 6 act as substantially decoupled voltage dependent optical retarders. The optic (slow) axes of these regions are then effectively determined by the rubbing directions of the alignment layers 9 and 10 and so are orthogonal to each other. The retardations of these decoupled retarders thus cancel each other out and the device has substantially no effect on the polarization of light passing therethrough. In this state, the device passes the vertically polarized light from the polariser 1 substantially without rotating or changing the polarization state of the light.

Figure 4:
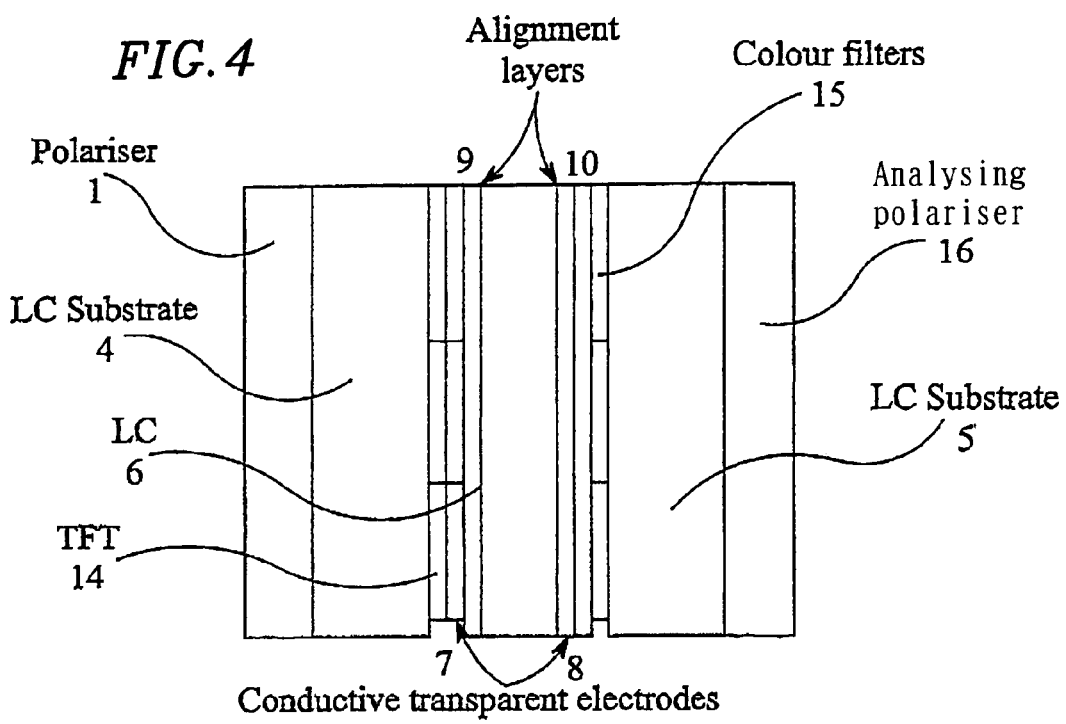
FIG. 4 is a cross-sectional diagram illustrating the use of the rotator of FIG. 2 as a display.

As shown in FIG. 4, a rotator of this type may be used as a pixellated liquid crystal display. The electrode 7 is divided into individual pixel electrodes, each of which is associated with a thin film transistor (TFT) 14 forming part of an active matrix addressing arrangement of the display. Colour filters 15, such as red, green and blue filters, are formed on the substrate 5 in order to provide a colour display and an analysing polariser 16 is formed or disposed on the outer surface of the substrate 5. The transmission axis of the analysing polariser 16 is orthogonal to the transmission axis of the polariser 1 so that, when a sufficient electric field is applied across a pixel, the analysing polariser 16 substantially extinguishes light passing through the pixel, which therefore appears in its dark or black state. When the applied field is removed, the pixel rotates the plane of polarization by 45° so that the polarization plane is oriented at 45° with respect to the transmission axis of the analysing polariser 16. The pixel therefore appears in its bright or maximally transmissive state.

Figure 5:
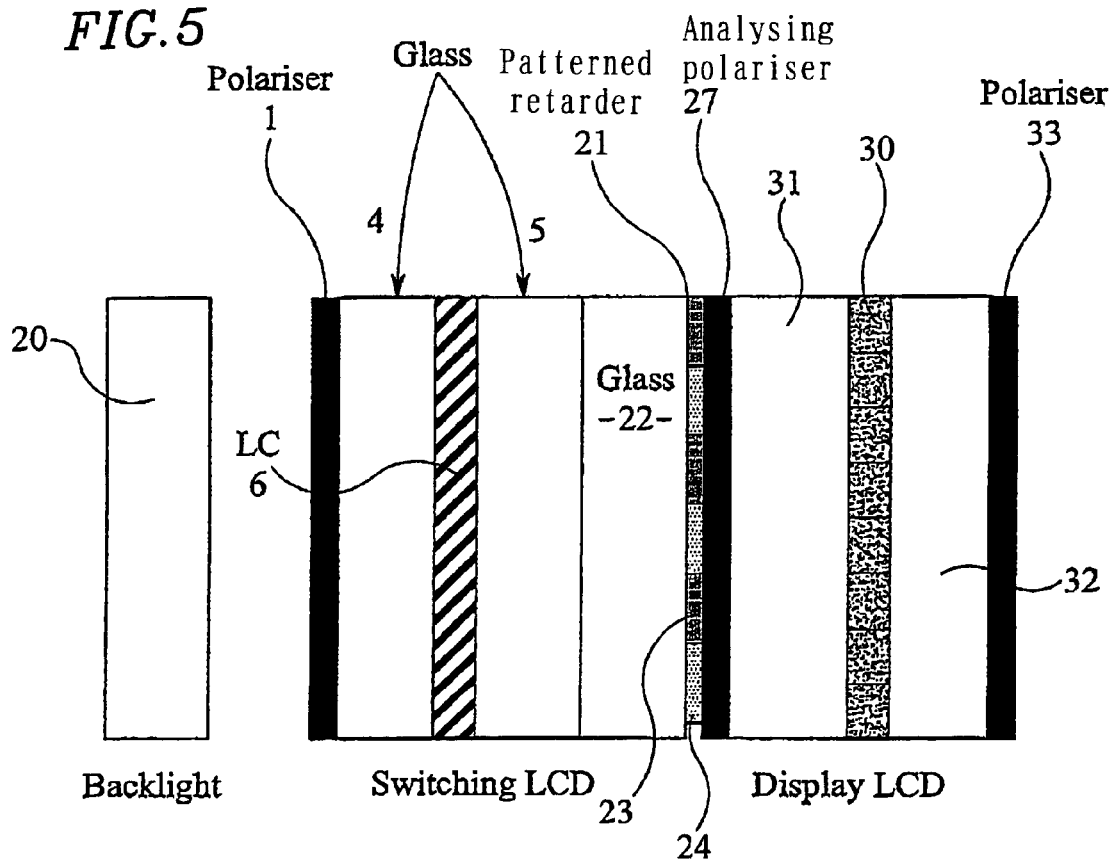
FIG. 5 is a cross-sectional diagram illustrating the use of the rotator of FIG. 2 as part of a parallax barrier in a display which is switchable between a two dimensional (2D) mode and an autostereoscopic three dimensional (3D) mode.

FIG. 5 illustrates the use of the rotator in a display of the type disclosed in British patent application No. 0215059.7. The display comprises a backlight 20 disposed behind the input polariser 1 and a switching LCD in the form of the rotator shown in FIG. 2. Light from the rotator passes to a patterned retarder 21 formed on a glass substrate 22. The patterned retarder 21 has first regions such as 23 for acting as parallax barrier slits and second regions such as 24 for acting as "opaque" barrier regions in the autostereoscopic 3D mode of the display.

The orientations of the various axes are shown in FIG. 6. The transmission axis 3 of the polariser 1 is oriented at 45°. The alignment direction 11 of the alignment layer 9 is oriented at 22.5°. The alignment direction 12 of the alignment layer 10 is oriented at 112.5°. The regions 23 have slow axes 25 oriented at 90° whereas the regions 24 have slow axes 26 oriented at 45°. An analysing polariser 27 for the switching LCD has a transmission axis 28 oriented at 135° i.e. orthogonal to the transmission axis 3 of the input polariser 1.

The display further comprises a pixellated spatial light modulator (SLM) in the form of a "display LCD". The display LCD comprises a pixellated liquid crystal layer 30 disposed between substrates 31 and 32. Alignment layers, electrodes, colour filters and addressing arrangements are not shown in FIG. 5 for the sake of clarity. The analysing polariser 27 acts as an input polariser for the LCD and an output polariser 33 is provided on the outer surface of the substrate 32. The display LCD may be of any suitable type for displaying images.

In the 3D mode, the polarization rotator is switched off by applying a voltage across the liquid crystal layer 6 so that no polarization rotation takes place. Light from the polariser with the polarization direction parallel to the transmission axis 3 passes through the rotator with its polarization unchanged and likewise passes through the regions 24 with its polarization unchanged. The transmission axis 28 of the analysing polariser 27 is perpendicular to the polarization so that light passing through the regions 24 is substantially extinguished.

Light incident on the regions 23 is polarized at −45° with respect to the optic axis 25. The polarization direction is rotated by 90° through the regions 23 so as to be aligned with the transmission axis 28 of the analysing polariser 27. The slits regions 23 thus appear substantially transparent so that the retarder 21 and associated elements act as a rear parallax barrier.

In the 2D mode, no field is applied across the liquid crystal layer 6. This layer therefore provides 45° of polarization rotation so that the polarization direction of light incident on the patterned retarder 21 is 90°. The regions 23 do not affect the polarization direction whereas the regions 24 cause the polarization to be rotated by −90°. Light from both the regions 23 and 24 therefore has polarization directions oriented at 45° with respect to the transmission axis 28 of the analysing polariser 27, so that the display LCD receives light of substantially the same intensity from the regions 23 and 24. The barrier structure is therefore substantially invisible and the display operates in the 2D mode.

FIG. 7 illustrates a modification to the arrangements shown in FIGS. 5 and 6 in order to provide an arrangement for use in the display disclosed in British patent application No. 0215058.9. In such a display, the brightness in the 2D mode is substantially increased at the expense of a smaller decrease in brightness of the bright state of the 3D mode. A polarization rotation of 55° is required for such a display and the relevant orientations are illustrated in FIG. 7. Thus, the alignment direction 11 is oriented at 27.5°, the alignment direction 12 is oriented at 117.5°, and the optic axis 25 is oriented at 100°. The other orientations are as shown in FIG. 6. In order to provide the 55° rotation, the retardation $\Delta n.d/\lambda$ of the liquid crystal layer is 0.55.

Although an example with 55° of polarization rotation is illustrated in FIG. 7, other rotations may be provided as necessary according to the needs of the particular example of the display.

In general, the required polarization rotation angle is the same as the included angle between the slow axes 25 and 26 of the retarder regions 23 and 24, respectively.

FIG. 8 illustrates an arrangement which differs from those shown in FIGS. 5 and 6 in that the orientation and retardation are changed to optimise the output of the patterned retarder 21 so as to achieve substantially identical spectral responses from the regions 23 and 24 in the 2D mode. The liquid crystal layer 6 has a retardation $\Delta n.d/\lambda=0.415$, the alignment direction 11 is oriented at 57.5°, and the alignment direction 12 is oriented at 147.5°.

FIG. 9 illustrates a generic arrangement which different from the arrangement of FIG. 2 in that an output polarising analyser 27 having a transmission axis 28 is provided. The alignment direction 11 of the alignment layer 9 is oriented at an angle è in either direction with respect to the transmission axis 3 of the input polariser 1. The alignment direction 12 of the alignment layer 10 is orthogonal to the alignment direction 11. The output polarization 13 is rotated by γ compared with the input polarization 3' of light from the polariser 1 and the transmission axis 28 is oriented at (γ±n.90) with respect to the transmission axis 3, where n is any integer (positive or negative or zero). Thus, the transmission axis 28 may be parallel to or orthogonal to the output polarization 13 in the absence of an applied field across the liquid crystal layer 6.

FIG. 10 illustrates an arrangement which differs from the arrangement of FIG. 9 in that the transmission axis 28 of the analysing polariser 27 is oriented at (±n.90) with respect to the transmission axis 3. Again, n may be any integer (positive or negative or zero). The transmission axis 28 may therefore be parallel to or orthogonal to the transmission axis 3.

The embodiments described hereinbefore use a layer of nematic liquid crystal material having positive dielectric anisotropy. In such embodiments, the alignment surfaces for the liquid crystal material provide relatively small pre-tilt angles whose azimuths are orthogonal to each other. In the absence of an applied field, there is a 90° twist in the liquid crystal director from one alignment surface to the other.

Other liquid crystal modes may be used, for example in the arrangements shown in the drawings, with modifications as appropriate to the actual mode of operation. For example, the liquid crystal material may comprise a nematic material of negative dielectric anisotropy and the alignment surfaces may be arranged to induce a substantially homeotropic orientation of the liquid crystal director in the absence of an applied field. The liquid crystal adjacent the alignment surfaces has a high pre-tilt, for example close to 90°. In the absence of an applied field, the homeotropic alignment results in substantially no change to the polarization state of light passing through the layer.

When an electric field is applied across the layer of such a material, the pre-tilt caused by the alignment surface and/or a structure such as the electrode structure below the alignment surface causes the liquid crystal directors of the molecules near the alignment surfaces to be reoriented in a predetermined direction. The liquid crystal material may also include a chiral dopant whose concentration may be such as to induce a pitch of twist in the liquid crystal layer such that the ratio of the pitch to the thickness of the layer is substantially equal to 0.25. When an electric field greater than a predetermined voltage is applied across the layer, the layer takes up a substantially 90° twist. Thus, in such embodiments, the polarization rotator is active in the presence of an applied field and is inactive in the absence of an applied field.

It is also possible to provide embodiments in which the liquid crystal material is of the smectic type.

A polarization rotator of the type shown in FIG. 2 may be used in other applications, one example of which is as an optical modulator, for example in telecommunication applications. For example, the rotator may be used to provide a π phase modulator by selectively providing a polarization rotation of 180°, which is equivalent to inducing a π phase lag in linearly polarized light. In order to produce a 180° polarization rotation, the retardation Δn.d/λ of the liquid crystal layer may be made 1.414 and the angle between the azimuth of the incident linear polarization and the input director of the liquid crystal may be made 45°. The phase change provided by the modulator may be controlled by a relatively low modulating voltage, for example about 3 volts, which is compatible with CMOS technology.

As an alternative, a polarization rotation close to 180° may be used to achieve almost the same effect. For example, a rotation of 178° may be achieved with Δn.d/λ=0.105 and θ=44°. Such a low retardation allows the use of a very thin liquid crystal layer which, in turn, provides a very rapid response time. This is advantageous in telecommunication applications, where fast switching is very desirable.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A polarization rotator for rotating a polarization direction of linearly polarized input light by an angle γ different from 90°, comprising a first input alignment surface, a second output alignment surface, and a layer of liquid crystal material having a liquid crystal director and being disposed between said first alignment surface and said second alignment surface, said rotator having a mode in which a 90° twist of said liquid crystal director is induced across said layer, the layer having a retardation substantially given by:

$$\tan[\pm\frac{\pi}{2}-\gamma] = \frac{\tan[\pm\frac{\pi}{2}\cdot\sqrt{1+\alpha^2}]}{\sqrt{1+\alpha^2}}$$

$$\alpha = \pm\frac{2\cdot\Delta n\cdot d}{\lambda}$$

$$2\theta = \gamma \mp \frac{\pi}{2}$$

where λ is a wavelength of light, Δn is a birefringence of said liquid crystal material, d is a thickness of said layer, and θ is an angle between said polarization direction of said input light and an alignment direction of said first alignment surface, and where 175°≦|γ|≦180°.

2. A rotator as claimed in claim 1, in which λ is a wavelength of visible light.

3. A rotator as claimed in claim 1, having a further mode in which there is substantially no twist of said liquid crystal director across said layer.

4. A rotator as claimed in claim 1, in which said first and second alignment surfaces induce said 90° twist of said director across said layer.

5. A rotator as claimed in claim 1, in which said liquid crystal material contains a chiral dopant.

6. A rotator as claimed in claim 5, in which said chiral dopant induces said 90° twist of said director across said layer.

7. A rotator as claimed in claim 1, in which said liquid crystal material is a nematic liquid crystal material of positive dielectric anisotropy.

8. A rotator as claimed in claim 1, in which said liquid crystal material is a smectic liquid crystal material.

9. A rotator as claimed in claim 1, in which said liquid crystal material is a nematic liquid crystal material of negative dielectric anisotropy.

10. A rotator as claimed in claim 1, in which said first and second alignment surfaces induce first and second pretilts which are substantially equal to each other.

11. A rotator as claimed in claim 1, comprising an electrode arrangement for selectively applying a field across at least one region of said layer.

12. A rotator as claimed in claim 11, in which said electrode arrangement comprises one of an active matrix and a passive matrix.

13. A rotator as claimed in claim 1, comprising an input polariser having a transmission axis oriented at −θ to said alignment direction of said first alignment surface.

14. A rotator as claimed in claim 1, comprising an output polariser having a transmission axis substantially perpendicular to said polarization direction of said input light.

15. A rotator as claimed in claim 1, comprising an output polariser having a transmission axis oriented at substantially $(\gamma+n.90)°$ to said polarization direction of said input light, where n is an integer.

16. A rotator as claimed in claim 1, in which $\gamma=180°$, $\theta=\pm45°$ and $\Delta n.d/\lambda=1.414$.

17. A rotator as claimed in claim 1, in which $\gamma=\pm178°$, $\theta=\pm44°$ and $\Delta n.d/\lambda=0.105$.

18. A polarization rotator for rotating a polarization direction of linearly polarized input light by an angle $\gamma$ different from 90°, comprising a first input alignment surface, a second output alignment surface, and a layer of liquid crystal material having a liquid crystal director and being disposed between said first alignment surface and said second alignment surface, said rotator having a mode in which a 90° twist of said liquid crystal director is induced across said layer, the layer having a retardation substantially given by:

$$\tan\left[\pm\frac{\pi}{2}-\gamma\right] = \frac{\tan\left[\pm\frac{\pi}{2}\cdot\sqrt{1+\alpha^2}\right]}{\sqrt{1+\alpha^2}}$$

$$\alpha = \pm\frac{2\cdot\Delta n\cdot d}{\lambda}$$

$$2\theta = \gamma \mp \frac{\pi}{2}$$

where $\lambda$ is a wavelength of light, $\Delta n$ is a birefringence of said liquid crystal material, d is a thickness of said layer, $\theta$ is an angle between said polarization direction of said input light and an alignment direction of said first alignment surface, and where $175°\leq|\gamma|\leq180°$ and $\Delta n.d/\lambda=1414$.

19. A rotator as claimed in claim 18, in which $\theta=\pm45°$.

20. A polarization rotator for rotating a polarization direction of linearly polarized input light by an angle $\gamma$ different from 90°, comprising a first input alignment surface, a second output alignment surface, and a layer of liquid crystal material having a liquid crystal director and being disposed between said first alignment surface and said second alignment surface, said rotator having a mode in which a 90° twist of said liquid crystal director is induced across said layer, the layer having a retardation substantially given by:

$$\tan\left[\pm\frac{\pi}{2}-\gamma\right] = \frac{\tan\left[\pm\frac{\pi}{2}\cdot\sqrt{1+\alpha^2}\right]}{\sqrt{1+\alpha^2}}$$

$$\alpha = \pm\frac{2\cdot\Delta n\cdot d}{\lambda}$$

$$2\theta = \gamma \mp \frac{\pi}{2}$$

where $\lambda$ is a wavelength of light, $\Delta n$ is a birefringence of said liquid crystal material, d is a thickness of said layer, $\theta$ is an angle between said polarization direction of said input light and an alignment direction of said first alignment surface, and where $175°\leq|\gamma|\leq180°$ and $42.5°\leq|\theta|\leq45°$ or $132.5°\leq|\theta|\leq135°$.

21. A polarization rotator for rotating a polarization direction of linearly polarized input light by an angle $\gamma$ different from 90°, comprising a first input alignment surface, a second output alignment surface, and a layer of liquid crystal material having a liquid crystal director and being disposed between said first alignment surface and said second alignment surface, said rotator having a mode in which a 90° twist of said liquid crystal director is induced across said layer, the layer having a retardation substantially given by:

$$\tan\left[\pm\frac{\pi}{2}-\gamma\right] = \frac{\tan\left[\pm\frac{\pi}{2}\cdot\sqrt{1+\alpha^2}\right]}{\sqrt{1+\alpha^2}}$$

$$\alpha = \pm\frac{2\cdot\Delta n\cdot d}{\lambda}$$

$$2\theta = \gamma \mp \frac{\pi}{2}$$

where $\lambda$ is a wavelength of light, $\Delta n$ is a birefringence of said liquid crystal material, d is a thickness of said layer, $\theta$ is an angle between said polarization direction of said input light and an alignment direction of said first alignment surface, and where $175°\leq|\gamma|\leq180°$ and $\Delta n.d/\lambda=0.105$.

22. A rotator as claimed in claim 21, in which $\theta=\pm44°$.

23. A display comprising a polarization rotator for rotating a polarization direction of linearly polarized input light by an angle $\gamma$ different from 90°, comprising a first input alignment surface, a second output alignment surface, and a layer of liquid crystal material having a liquid crystal director and being disposed between said first alignment surface and said second alignment surface, said rotator having a mode in which a 90° twist of said liquid crystal director is induced across said layer, the layer having a retardation substantially given by:

$$\tan\left[\pm\frac{\pi}{2}-\gamma\right] = \frac{\tan\left[\pm\frac{\pi}{2}\cdot\sqrt{1+\alpha^2}\right]}{\sqrt{1+\alpha^2}}$$

$$\alpha = \pm\frac{2\cdot\Delta n\cdot d}{\lambda}$$

$$2\theta = \gamma \mp \frac{\pi}{2}$$

where $\lambda$ is a wavelength of light, $\Delta n$ is a birefringence of said liquid crystal material, d is a thickness of said layer, $\theta$ is an angle between said polarization direction of said input light and an alignment direction of said first alignment surface, and where $175°\leq|\gamma|\leq180°$.

24. An optical modulator comprising a polarization rotator for rotating a polarization direction of linearly polarized input light by an angle $\gamma$ different from 90°, comprising a first input alignment surface, a second output alignment surface, and a layer of liquid crystal material having a liquid crystal director and being disposed between said first alignment surface and said second alignment surface, said rotator having a mode in which a 90° twist of said liquid crystal director is induced across said layer, the layer having a retardation substantially given by:

$$\tan\left[\pm\frac{\pi}{2}-\gamma\right] = \frac{\tan\left[\pm\frac{\pi}{2}\cdot\sqrt{1+\alpha^2}\right]}{\sqrt{1+\alpha^2}}$$

$$\alpha = \pm\frac{2\cdot\Delta n\cdot d}{\lambda}$$

$$2\theta = \gamma \mp \frac{\pi}{2}$$

where $\lambda$ is a wavelength of light, $\Delta n$ is a birefringence of said liquid crystal material, d is a thickness of said layer, $\theta$ is an angle between said polarization direction of said input light and an alignment direction of said first alignment surface, and where $175° \leq |\gamma| \leq 180°$.

25. A parallax barrier comprising a polarization rotator for rotating a polarization direction of linearly polarized input light by an angle γ different from 90°, comprising a first input alignment surface, a second output alignment surface, and a layer of liquid crystal material having a liquid crystal director and being disposed between said first alignment surface and said second alignment surface, said rotator having a mode in which a 90° twist of said liquid crystal director is induced across said layer, the layer having a retardation substantially given by:

$$\tan\left[\pm\frac{\pi}{2} - \gamma\right] = \frac{\tan\left[\pm\frac{\pi}{2} \cdot \sqrt{1+\alpha^2}\right]}{\sqrt{1+\alpha^2}}$$

$$\alpha = \pm\frac{2 \cdot \Delta n \cdot d}{\lambda}$$

$$2\theta = \gamma \mp \frac{\pi}{2}$$

where λ is a wavelength of light, Δn is a birefringence of said liquid crystal material, d is a thickness of said layer, and θ is an angle between said polarization direction of said input light and an alignment direction of said first alignment surface.

26. A barrier as claimed in claim 25, comprising a patterned retarder.

27. A barrier as claimed in claim 26, in which said retarder is a halfwave retarder.

28. A barrier as claimed in claim 27, in which said retarder comprises first and second regions having slow axes and γ is equal to an included angle between said slow axes of said first and second regions.

29. A barrier as claimed in claim 28, in which said included angle is between 40° and 70°.

30. A barrier as claimed in claim 29, in which said slow axis of one of said first and second regions is one of parallel and perpendicular to said polarization direction of said input light.

31. A barrier as claimed in claim 30, in which said slow axis of another of said first and second regions is oriented at 45° to said polarization direction of said input light.

32. A barrier as claimed in claim 30, in which said slow axis of another of said first and second regions is oriented at 55° to said polarization direction of said input light.

* * * * *